(12) United States Patent
Ryu et al.

(10) Patent No.: US 6,612,722 B2
(45) Date of Patent: Sep. 2, 2003

(54) LIGHT GUIDE PANEL FOR BACKLIGHT

(75) Inventors: Su-Sun Ryu, Cheonan (KR);
Chang-Yong Lee, Cheonan (KR);
Eun-Shik Lim, Pyongtaek (KR);
Shin-Hyung Lee, Pyongtaek (KR)

(73) Assignee: Vision High-Tech Co., Ltd. (KR)

( * ) Notice: Subject to any disclaimer, the term of this patent is extended or adjusted under 35 U.S.C. 154(b) by 0 days.

(21) Appl. No.: 10/053,317

(22) Filed: Jan. 17, 2002

(65) Prior Publication Data

US 2002/0181223 A1 Dec. 5, 2002

(30) Foreign Application Priority Data

Mar. 30, 2001 (KR) .......................................... 2001-17034

(51) Int. Cl.$^7$ ................................................. F21V 5/00
(52) U.S. Cl. ........................... 362/331; 362/26; 362/31; 349/65
(58) Field of Search ............................ 362/31, 26, 339, 362/330, 332, 333, 331; 349/65

(56) References Cited

U.S. PATENT DOCUMENTS

| | | | | |
|---|---|---|---|---|
| 5,134,549 A | * | 7/1992 | Yokoyama | 362/31 |
| 5,386,347 A | * | 1/1995 | Matsumoto | 362/31 |
| 5,394,308 A | * | 2/1995 | Watanabe et al. | 362/31 |
| 5,600,455 A | * | 2/1997 | Ishikawa et al. | 349/57 |
| 6,099,134 A | * | 8/2000 | Taniguchi et al. | 362/31 |
| 6,334,689 B1 | * | 1/2002 | Taniguchi et al. | 362/31 |

* cited by examiner

*Primary Examiner*—Sandra O'Shea
*Assistant Examiner*—John Anthony Ward
(74) *Attorney, Agent, or Firm*—Cantor Colburn LLP

(57) ABSTRACT

Disclosed is a light guide panel for a backlight. The light guide panel comprises a plurality of groups of cells regularly or irregularly formed on at least one surface of the light guide panel, with each cell having regularly or irregularly arranged therein a plurality of micro cells.

8 Claims, 7 Drawing Sheets

LIGHT GUIDE PANEL FOR BACKLIGHT

BACKGROUND OF THE INVENTION

1. Field of the Invention

The present invention relates to a light guide panel for a backlight, which is used in a liquid crystal display device, and more particularly, the present invention relates to a light guide panel for a backlight, which minimizes loss of light introduced thereto and has various patterns on a surface thereof, thereby being able to ensure increased luminance and uniform distribution of luminance, through adjustment of a quantity of light, a scattering angle of light, etc.

2. Description of the Related Art

These days, a variety of displays have been disclosed in the art, and a typical example of these displays is a thin film transistor-liquid crystal display (TFT-LCD).

A liquid crystal display device is characterized as an optical element incapable of emitting light by itself, and therefore, in order to allow the liquid crystal display device to adequately perform its function, a backlight is provided.

Referring to FIG. 1, there is shown a perspective view schematically illustrating a construction of a conventional backlight for a notebook computer. As shown in FIG. 1, the conventional backlight 1 comprises a lamp 19 serving as a light source for emitting light, a light guide panel 13 for guiding and reflecting light emitted from the lamp 19 toward a LCD panel 18, a first diffusing sheet 14 for diffusing at predetermined angles light exiting the light guide panel 13, vertical and horizontal prism sheets 15 and 16 for converging and transmitting diffused light toward the LCD panel 18, and a second diffusing sheet 17 for diffusing at preselected angles light having passed through the prism sheets 15 and 16. The LCD panel 18 is arranged on the second diffusing sheet 17. A reflecting sheet 12 and a case 11 are disposed under the light guide panel 13. The reflecting sheet 12 performs a function of reflecting light rays scattered by the light guide panel 13 in the direction toward the LCD panel 18 and thereby minimizing loss of light.

In addition to the backlight 1 for a notebook computer, various backlights such as for a monitor are disclosed in the art. While the backlights can be constructed in slightly different ways depending upon use, they adopt basically the same principle. For example, while the construction of the backlight 1 for a notebook computer is slightly different from that of a backlight for a monitor in respect of sheet arrangement, they adopt basically the same operational characteristics.

The light guide panel 13 is an essential component element in the construction of the backlight 1, and functions to scatter light emitted from the lamp 19 and transmit scattered light in the direction toward the LCD panel 18.

Referring to FIG. 2, there is shown a cross-sectional view illustrating the conventional light guide panel employed in the backlight shown in FIG. 1. As shown in FIG. 2, the conventional light guide panel 13 has planar lower and upper surfaces 131 and 132. Light emitted from the lamp 19 serving as a light source is incident on the lower surface 131, and the incident light is reflected upward. In this type of light guide panel 13, it was found that loss of light is remarkable, and luminance and luminance distribution uniformity are poor.

To solve these problems, a great deal of efforts have been attempted toward efficient use of light, and resultingly, a technique of forming micro protrusions on a lower surface of a light guide panel through a separate printing process is disclosed in the art.

FIG. 3 is a cross-sectional view illustrating another conventional light guide panel formed with micro protrusions. As shown in FIG. 3, micro protrusions 133 are formed on the lower surface 131 of the light guide panel 13. Due to the presence of the micro protrusions 133, scattering and scattered light reflection are promoted.

However, in the case of the light guide panel 13 which is formed with the micro protrusions 133, since the micro protrusions 133 are formed through an ultraviolet-curing printing method which uses pigments, they tend to absorb light. As a consequence, loss of light is still substantial, and it is impossible to secure high luminance and luminance distribution uniformity. Also, due to the fact that the micro protrusions 133 are formed using pigments tending to absorb light, a color intensity of light varies with the lapse of time, whereby a quality of the liquid crystal display device is deteriorated and a lifetime thereof is shortened.

To cope with these problems, attempts have been made to develop a printless type light guide panel which is manufactured without the need of implementing a printing process. In these attempts, micro protrusions are formed on a lower surface of a light guide panel by implementing an etching process on a surface of a mold or on the lower surface of the light guide panel.

In this technique for forming a light guide panel, although improvement is accomplished to some extent in terms of methodology, it is still impossible to secure high luminance and luminance distribution uniformity.

SUMMARY OF THE INVENTION

Accordingly, the present invention has been made in an effort to solve the problems occurring in the related art, and an object of the present invention is to provide a light guide panel for a backlight, which scatters light emitted from a light source and transmits scattered light in the direction toward a LCD panel in such a way as to minimize loss of light, and at the same time, is able to perform light diffusing and converging functions.

In order to achieve the above object, according to the present invention, there is provided a light guide panel for a backlight, comprising: a plurality of groups of cells regularly or irregularly formed on at least one surface of the light guide panel, with each cell having regularly or irregularly arranged therein a plurality of micro cells.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
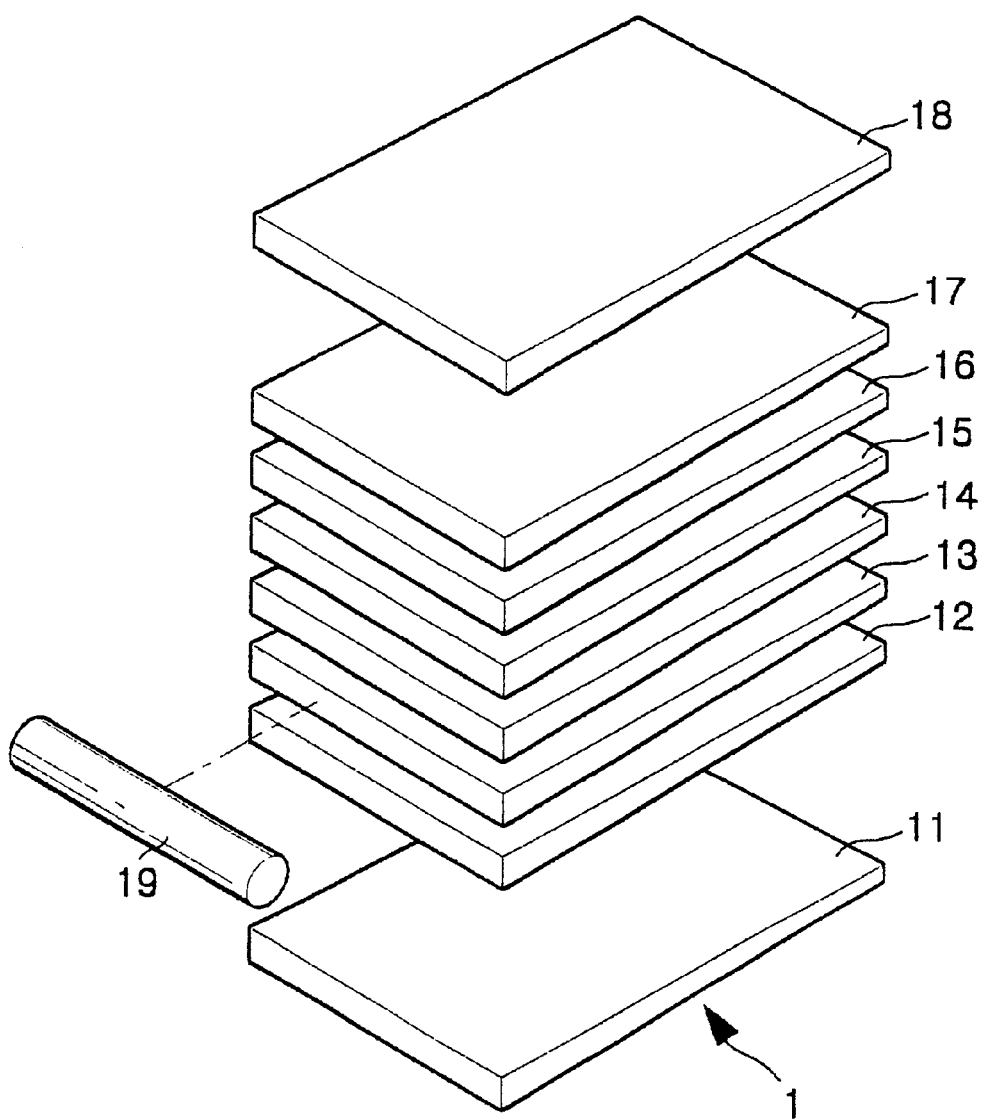
FIG. 1 is a perspective view schematically illustrating a construction of a conventional backlight for a notebook computer.
Figure 2:
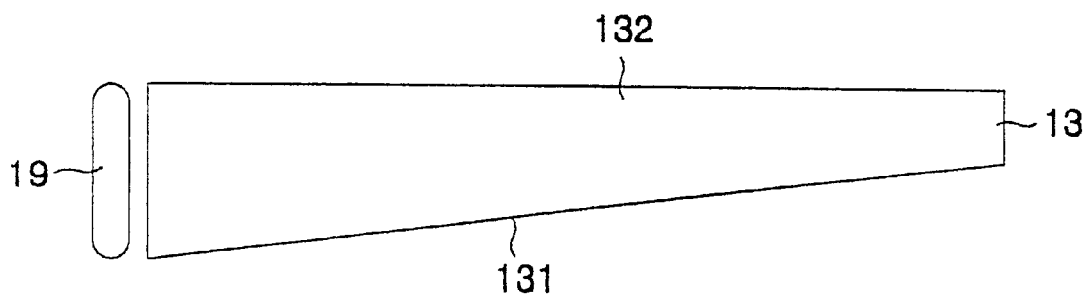
FIG. 2 is a cross-sectional view illustrating a conventional light guide panel employed in the backlight shown in FIG. 1.
Figure 3:
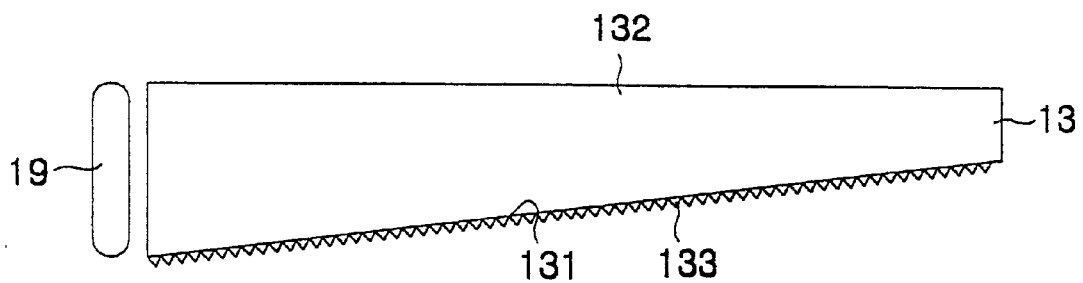
FIG. 3 is a cross-sectional view illustrating another conventional light guide panel formed with micro protrusions.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 4:
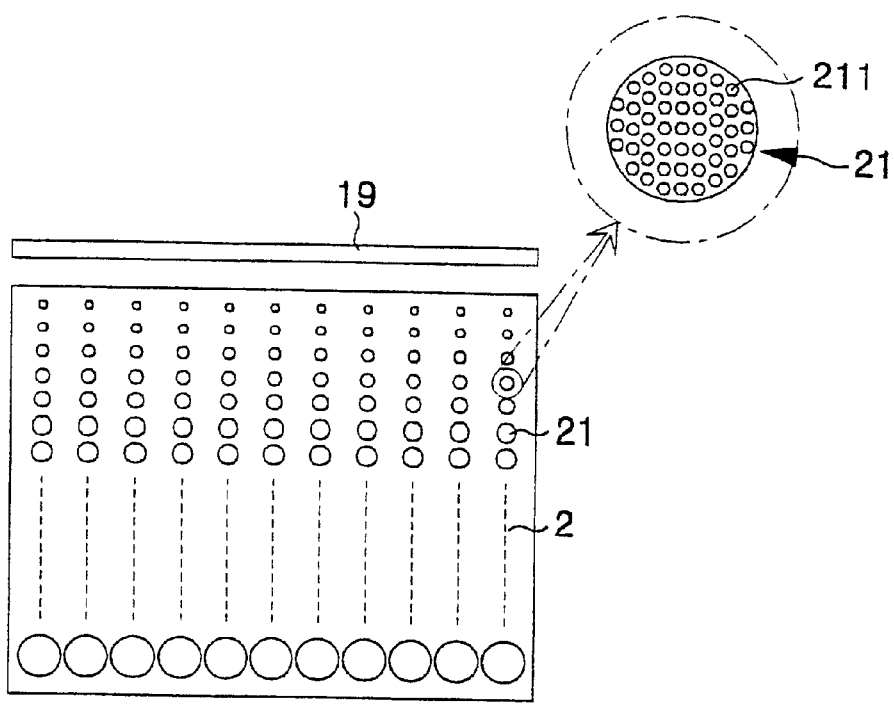
FIG. 4 is a plan view illustrating a state wherein cell groups are formed on a surface of a light guide panel for a backlight in accordance with a first embodiment of the present invention.

FIG. 4 is a plan view illustrating a state wherein cell groups are formed on a surface of a light guide panel for a backlight in accordance with a first embodiment of the present invention. As shown in FIG. 4, a plurality of groups of cells 21 are regularly formed on a surface of a light guide panel 2, and each cell 21 is composed of a plurality of micro cells 211. Each cell 21 can be formed to have a diversity of contours such as a circular contour as shown in the drawing and a contour of one of polygons inclusive of a triangle. A spacing between two adjoining cells 21 can be appropriately adjusted as occasion demands. Each cell 21 has a diameter or width of 100 $\mu$m to 500 $\mu$m.

In the light guide panel 2 constructed as mentioned above, when light emitted from a lamp 19 serving as a light source is incident on the light guide panel 2, due to the presence of the groups of cells 21 each composed of the micro cells 211, light scattering and scattered light reflection are effected in a variety of ways, in comparison with the conventional construction having simple micro protrusions, whereby it is possible to minimize loss of light.

Figure 5:
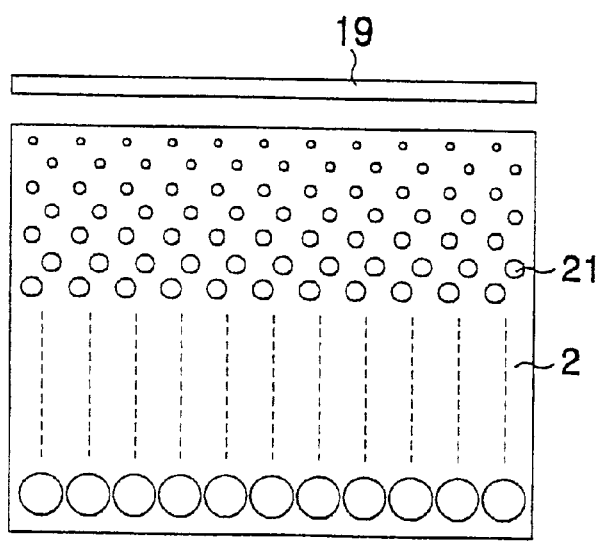
FIG. 5 is a plan view illustrating a state wherein cell groups are formed on a surface of a light guide panel for a backlight in accordance with a second embodiment of the present invention.

FIG. 5 is a plan view illustrating a state wherein cell groups are formed on a surface of a light guide panel for a backlight in accordance with a second embodiment of the present invention. As shown in FIG. 5, in this second embodiment of the present invention, each group of cells 21 are formed on the surface of the light guide panel 2 to define a zigzagged arrangement. By adjusting a separation between two adjoining zigzagged arrangements, a quantity of light can be controlled, and it is possible to prevent a moire phenomenon from occurring. The separation between two adjoining zigzagged arrangements is adjusted within the range of 1 $\mu$m to 100 $\mu$m.

In addition to the regular arrangement or the zigzagged arrangement as shown in FIGS. 4 and 5, the group of cells 21 can be formed to define a variety of arrangements. Also, it can be envisaged that the group of cells 21 can be formed on the surface of the light guide panel 2 in such a way as to define an irregular arrangement. By regularly or irregularly arranging the groups of cells 21 as described above, it is possible to control an entire quantity of light, a scattering angle of light, etc. Accordingly, entire brightness control, brightness uniformity control and light exit angle control are enabled, whereby it is possible to provide the light guide panel 2 which has excellent luminance and luminance distribution uniformity.

By altering a shape, density, distribution, position, arrangement, and so forth, of the micro cells 211 and each cell 21 composed of the micro cells 211, a quantity of light, a scattering angle, etc. can be adjusted in such a way as to increase luminance, and thereby entire luminance distribution uniformity can be improved.

Each cell 21 which is composed of the plurality of micro cells 211 can be directly formed on the surface of the light guide panel 2 or on a bottom of a depression defined on the surface of the light guide panel 2. Also, the cells 21 can be commonly formed on the surface of the light guide panel 2 and on bottoms of depressions defined on the surface of the light guide panel 2.

Figure 6A:
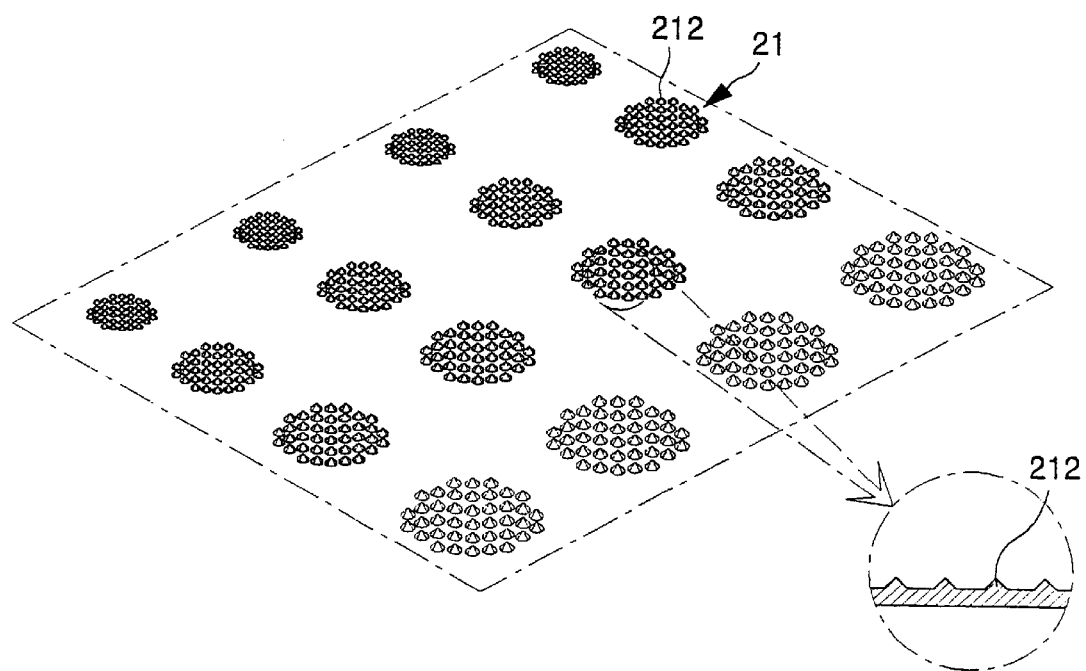
FIG. 6a is a partially enlarged perspective view of a surface of a light guide panel for a backlight in accordance with a third embodiment of the present invention, illustrating a contour of each cell.

FIG. 6a is a partially enlarged perspective view of a surface of a light guide panel for a backlight in accordance with a third embodiment of the present invention, illustrating a contour of each cell. As shown in FIG. 6a, each cell 21 formed on the surface of the light guide panel 2 is composed of a plurality of micro cells 212. At this time, the micro cells 212 of each cell 21 define an embossment pattern.

Figure 6B:
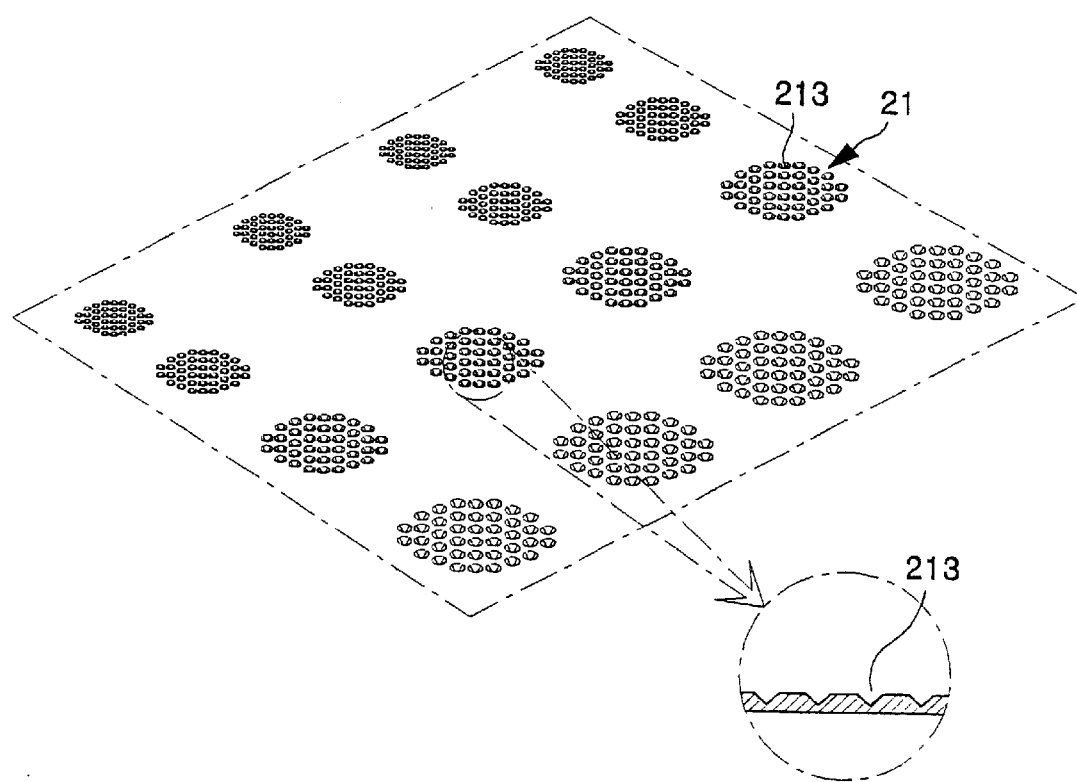
FIG. 6b is a partially enlarged perspective view of a surface of a light guide panel for a backlight in accordance with a fourth embodiment of the present invention, illustrating a contour of each cell.

FIG. 6b is a partially enlarged perspective view of a surface of a light guide panel for a backlight in accordance with a fourth embodiment of the present invention, illustrating a contour of each cell. As shown in FIG. 6b, each cell 21 formed on the surface of the light guide panel 2 is composed of a plurality of micro cells 213. At this time, the micro cells 213 of each cell 21 define an intaglio pattern.

Other than the embossment pattern and intaglio pattern respectively and independently defined by the micro cells 212 and the micro cells 213 as shown in FIGS. 6a and 6b, groups of cells 21, each of which is composed of the plurality of micro cells 212 defining the embossment pattern as shown in FIG. 6a, and groups of cells 21, each of which is composed of the plurality of micro cells 213 defining the intaglio pattern as shown in FIG. 6b, can be combinedly formed on the surface of a single light guide panel 2. Moreover, each cell 21 can have a combination of the micro cells 212 defining the embossment pattern and the micro cells 213 defining the intaglio pattern. Furthermore, in addition to the groups of cells as described with reference to FIGS. 6a and 6b, micro cells defining the embossment pattern or micro cells defining the intaglio pattern can be formed on the surface of the single light guide panel 2.

Therefore, due to the fact that the groups of cells 21 each of which has the micro cells 212 defining the embossment pattern and/or the groups of cells 21 each of which has the micro cells 213 defining the intaglio pattern are formed on the surface of the light guide panel 2, a light absorption phenomenon is prevented from occurring, and scattering and reflection of light are promoted. At the same time, brightness and darkness can be finely controlled.

While the groups of cells 21 can be formed on the surface of the light guide panel as shown in FIGS. 6a and 6b, they can be respectively formed on bottoms of depressions defined on the surface of the light guide panel 2.

Figure 7A:
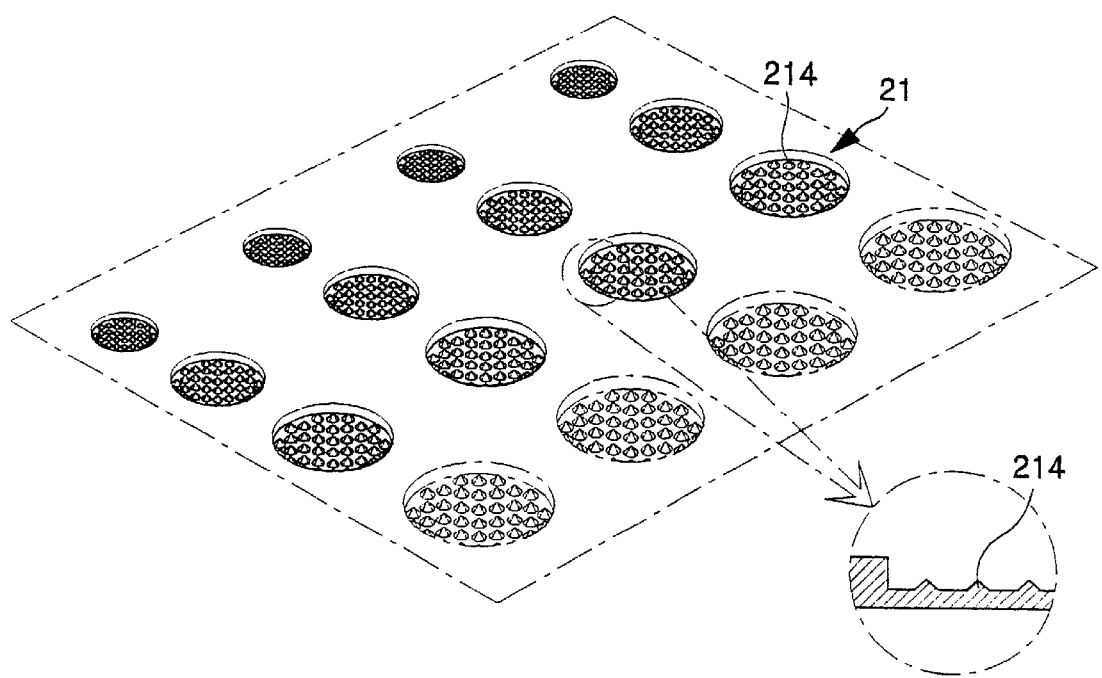
FIG. 7a is a partially enlarged perspective view of a surface of a light guide panel for a backlight in accordance with a fifth embodiment of the present invention, illustrating a contour of each cell.

FIG. 7a is a partially enlarged perspective view of a surface of a light guide panel for a backlight in accordance with a fifth embodiment of the present invention, illustrating a contour of each cell. As shown in FIG. 7a, each cell 21 is formed on a bottom of a depression defined on the surface of the light guide panel 2. Each cell 21 formed on the bottom of the depression defined on the surface of the light guide panel 2 is composed of a plurality of micro cells 214. At this time, the micro cells 214 of each cell 21 define an embossment pattern.

Figure 7B:
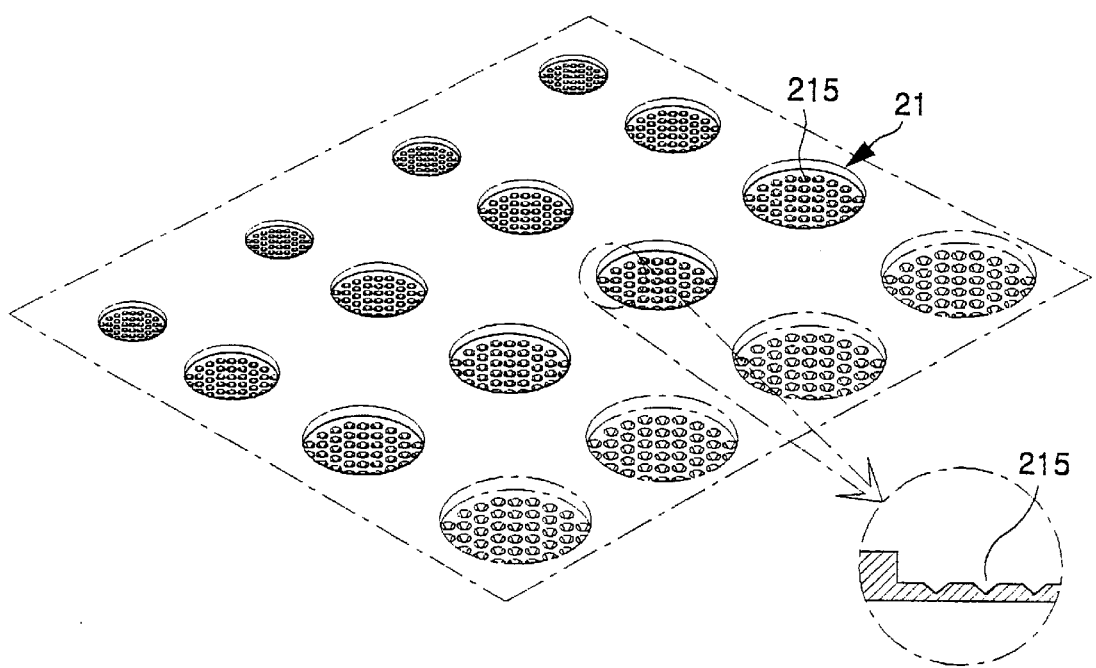
FIG. 7b is a partially enlarged perspective view of a surface of a light guide panel for a backlight in accordance with a sixth embodiment of the present invention, illustrating a contour of each cell.

FIG. 7b is a partially enlarged perspective view of a surface of a light guide panel for a backlight in accordance with a sixth embodiment of the present invention, illustrating a contour of each cell. As shown in FIG. 7b, each cell 21 is formed on a bottom of a depression defined on the surface of the light guide panel 2. Each cell 21 formed on the bottom of the depression defined on the surface of the light guide panel 2 is composed of a plurality of micro cells 215. At this time, the micro cells 215 of each cell 21 define an intaglio pattern.

Other than the embossment pattern and intaglio pattern respectively and independently defined by the micro cells 214 and the micro cells 215 as shown in FIGS. 7a and 7b, groups of cells 21, each of which is composed of the plurality of micro cells 214 defining the embossment pattern, and groups of cells 21, each of which is composed of the plurality of micro cells 215 defining the intaglio pattern, can be combinedly formed on the bottoms of the depressions defined on the surface of a single light guide panel 2. Moreover, each cell 21 can have a combination of the micro cells 214 defining the embossment pattern and the micro cells 215 defining the intaglio pattern. Furthermore, in addition to the groups of cells as described with reference to FIGS. 7a and 7b, micro cells defining the embossment pattern or micro cells defining the intaglio pattern can be formed on the bottoms of the depressions defined on the surface of the single light guide panel.

As a consequence, by forming the groups of cells 21 in a manner such that the micro cells 212, 213, 214 and 215 respectively constituting each cell 21 define various patterns as shown in FIGS. 6a, 6b, 7a and 7b, scattering and reflection of light are promoted. Further, by adequately adjusting the number of and altering a shape of the micro cells 212, 213, 214 or 215, it is possible to control an entire quantity of light, a scattering angle of light, etc. Due to this fact, in addition to a basic light transmitting function of the light guide panel, entire brightness control, brightness uniformity control and light exit angle control are enabled, whereby it is possible to provide the light guide panel 2 which has excellent luminance and luminance distribution uniformity.

At this time, each micro cell 212, 213, 214 or 215 is formed to have a diversity of shapes such as a cone as shown in the drawings, one of polypyramids inclusive of a triangular pyramid, a cylinder, a polyhedron, and the like. Each micro cell has a diameter or width of 10 μm to 100 μm and a height or depth of 5 μm to 50 μm. A distance between two adjoining micro cells can be appropriately adjusted. In particular, by altering a shape, density, distribution, position, arrangement, and so forth, of the micro cells 212, 213, 214 and 215, a quantity of light, a scattering angle, etc. can be adjusted.

As described above, in the present invention, due to the fact the groups of cells, each of which is composed of the plurality of micro cells, are formed on at least one surface of the light guide panel, in addition to a basic light transmitting function of the light guide panel, entire brightness control, brightness uniformity control and light exit angle control are enabled, whereby it is possible to secure excellent luminance and luminance distribution uniformity.

At this time, the light guide panel having the cell groups and micro cells may be manufactured by various conventional methods already known in the art. In particular, the cell groups and the micro cells can be formed on the surface of the light guide panel by etching a mold or by directly etching the lower surface.

The light guide panel according to the present invention was compared with the conventional light guide panel in terms of luminance, luminance distribution uniformity, yield and manufacturing cost, and results thereof are given in TABLE 1.

TABLE 1

| Classification | Conventional Light Guide Panel | Present Light Guide Panel |
|---|---|---|
| Luminance (cd/m$^2$) | 2,050 | 2,520 |
| Luminance Distribution Uniformity (%) | 75 | 88 |
| Yield (%) | 70 | 96 |
| Manufacturing Cost (%) | 100 | 54 |

As can be readily seen from TABLE 1, it was found that the present light guide panel reveals superior luminance and luminance distribution uniformity to the conventional light guide panel.

As apparent from the above description, the light guide panel for a backlight according to the present invention provides advantages in that it scatters light emitted from a light source and transmits scattered light in the direction toward a LCD panel in such a way as to minimize loss of light, and at the same time, is able to perform light diffusing and converging functions.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A light guide panel for a backlight, comprising:
   a first surface and a second surface opposite to the first surface; and
   a plurality of cells regularly or irregularly formed on at least one of the first and second surfaces, each cell having regularly or irregularly arranged therein a plurality of micro cells;
   wherein at least one of the first and second surfaces comprises a recess, and a plurality of micro cells is formed on a bottom of the recess.

2. The light guide panel as set forth in claim 1, wherein the plurality of cells is diagonally arranged.

3. The light guide panel as set forth in claim 2, wherein a distance between two adjacent cells is about 1 μm to about 100 μm.

4. The light guide panel as set forth in claim 1, wherein the bottom of the recess has a circular shape having a diameter of about 100 μm to about 500 μm.

5. The light guide panel as set forth in claim 1, wherein each micro cell has a shape of one of polypyramids, a cone, a cylinder and a polyhedron.

6. The light guide panel as set forth in claim 5, wherein each micro cell has a size of about 10 μm to about 100 μm in its diameter or width.

7. The light guide panel as set forth in claim 1, wherein the plurality of micro cells has a pattern, the pattern being at least one selected from the group consisting of an embossment pattern and an intaglio pattern.

8. The light guide panel as set forth in claim 1, wherein the bottom of the recess has a polygonal shape having a width of about 100 μm to about 500 μm.

* * * * *